US 8,726,080 B2

(12) United States Patent
Adkins et al.

(10) Patent No.: US 8,726,080 B2
(45) Date of Patent: May 13, 2014

(54) MERGING MULTIPLE CONTEXTS TO MANAGE CONSISTENCY SNAPSHOT ERRORS

(75) Inventors: Janet E. Adkins, Austin, TX (US); Matthew T. Brandyberry, Austin, TX (US); Manoj N. Kumar, Austin, TX (US); Andrew N. Solomon, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 275 days.

(21) Appl. No.: 13/210,093

(22) Filed: Aug. 15, 2011

(65) Prior Publication Data

US 2013/0047043 A1 Feb. 21, 2013

(51) Int. Cl.
*G06F 11/00* (2006.01)
(52) U.S. Cl.
USPC .................... 714/16; 714/43; 714/56
(58) Field of Classification Search
USPC .............................. 714/16, 43, 56
See application file for complete search history.

(56) References Cited

U.S. PATENT DOCUMENTS

| 6,687,847 | B1* | 2/2004 | Aguilera et al. | 714/4.3 |
| 7,487,395 | B2* | 2/2009 | van Ingen et al. | 714/16 |
| 7,603,391 | B1 | 10/2009 | Federwisch et al. | |
| 7,984,085 | B1* | 7/2011 | Aggarwal et al. | 707/825 |
| 2002/0049933 | A1* | 4/2002 | Nyu | 714/43 |
| 2006/0080362 | A1* | 4/2006 | Wagner et al. | 707/200 |
| 2007/0220328 | A1 | 9/2007 | Liu et al. | |

\* cited by examiner

*Primary Examiner* — Charles Ehne
(74) *Attorney, Agent, or Firm* — Yudell Isidore Ng Russell PLLC

(57) ABSTRACT

A method including creating a commit-in-progress context from a copy of a data object in a redirect-on-write file system; and begin storing the commit-in-progress context in a persistent storage device. The method further includes, while storing the commit-in-progress context in the persistent storage device: receiving a notification of a pending modification to the first data object, creating an update-in-progress context from a copy of the commit-in-progress context, and begin applying the modification to the update-in-progress context. The method further includes detecting that a connectivity error has occurred between the commit-in-progress context and the storage device, and in response, identifying whether the commit-in-progress context is successfully stored in the storage device. In response to identifying that the commit-in-progress context is not successfully stored: aborting the storing of the commit-in-progress context, assigning a new commit-in-progress context, and begin storing the new commit-in-progress context.

18 Claims, 8 Drawing Sheets

| |
|---|
| Buffer Header 300 |
| Last Committed Generation (LCG) 302 |
| Last Updated Generation (LUG) 304 |
| Last Committed Context (LCC) 306 |
| Last Updated Context (LUC) 308 |
| Physical Location 310 |
| Logical Location 312 |
| Data Pointer 0 (first copy of data) 314 |
| Data Pointer 1 (second copy of data) 316 |

*FIG. 3*

MERGING MULTIPLE CONTEXTS TO MANAGE CONSISTENCY SNAPSHOT ERRORS

BACKGROUND

1. Technical Field

The present invention generally relates to data processing systems and in particular to consistent data backups of a file system.

2. Description of the Related Art

File systems employ different methods to ensure the consistency of the stored data in the event of a system crash. One approach is for the file system to write modified data to new locations on the disk(s) in a bottom-up order every few seconds. These multiple views or copies of the data stored in the file system are called consistency snapshots. After a system crash, the file system starts with the last consistency snapshot of the data within the file system.

BRIEF SUMMARY

Aspects of the described embodiments provide a method, a system, and a computer program product for managing consistency snapshot errors in a file system. The method comprises: creating a commit-in-progress context from a copy of a first data object in a redirect-on-write file system; and begin storing the commit-in-progress context in a persistent storage device. The method further includes, while storing the commit-in-progress context in the persistent storage device: receiving a notification of a pending modification to the first data object; a processor creating an update-in-progress context from a copy of the commit-in-progress context; and begin applying the pending modification to the update-in-progress context. The method further includes detecting that a connectivity error has occurred while storing the commit-in-progress context to the persistent storage device; and in response to detecting that the connectivity error has occurred, identifying whether storage of the commit-in-progress context in the persistent storage device was successfully completed. In response to identifying that the storage of the commit-in-progress context was not successfully completed: aborting the storing of the commit-in-progress context in the persistent storage device, assigning a new commit-in-progress context from among the commit-in-progress context and the update-in-progress context to obtain a merged context, and begin storing the merged context in the persistent storage device as a next commit-in-progress content.

With the system implementation, the system includes a processor, a memory, and a fileset manager that performs the various processes of the method by executing code on the processor. Finally, the computer program product implementation comprises a computer readable storage medium that includes computer readable code which, when executed by a processor, the code is configured to perform the method processes.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments is to be read in conjunction with the accompanying drawings, wherein:

FIG. 3 depicts an example buffer header for a data object stored in a clustered file system, according to one or more embodiments.

DETAILED DESCRIPTION

Figure 1:
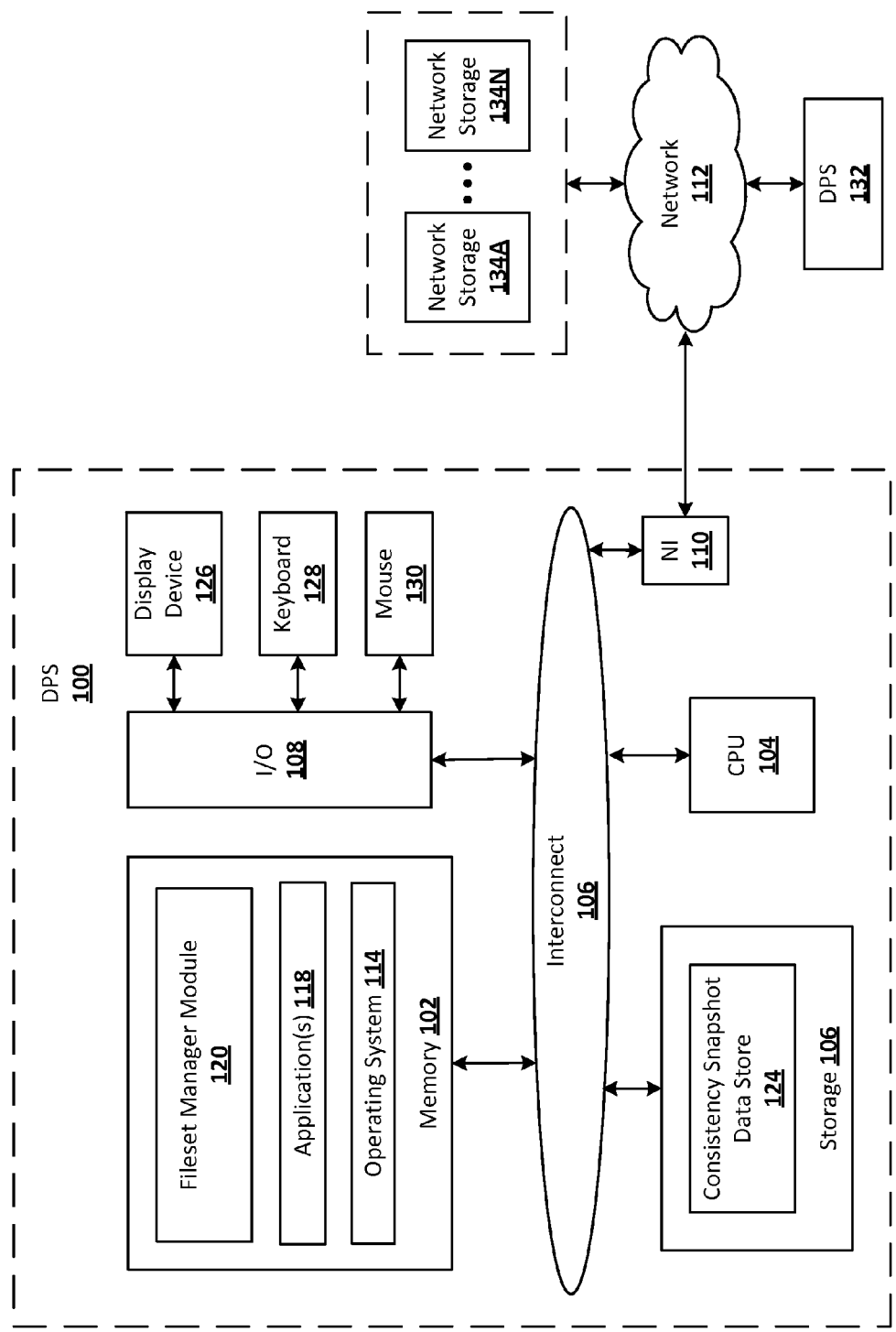
FIG. 1 provides a block diagram representation of an example data processing system within which the invention can be practiced, according to one embodiment.

The illustrative embodiments provide a method, system and computer program product for handling consistency snapshot errors for a file system. Briefly, a consistency snapshot for a data object in a file system is initiated by creating a commit-in-progress context from a copy of the data object, and storing the commit-in-progress context to a persistent storage device. During the time that the commit-in-progress context is being stored to the persistent storage device, a user may attempt to make a modification to the data object. When a modification to the data object is pending, an update-in-progress context of the data object is created from a copy of the commit-in-progress context. If an error is detected during the storing of the commit-in-progress context, then a determination is made whether the commit-in-progress has been successfully stored. When the commit-in-progress context has not been successfully stored, the storing of the commit-in-progress context is aborted, a new commit-in-progress context is assigning from among the commit-in-progress context and the update-in-progress context, and the new commit-in-progress context is stored in the persistent storage device as a new commit-in-progress context.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions (or code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a computer readable medium that can direct a computer, other programmable data processing apparatus, or other devices to function in a particular manner, such that the instructions stored in the computer readable medium produce an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components, devices, or parameters herein, without limitation. Each term utilized herein is to be given its broadest interpretation given the context in which that terms is utilized.

With reference now to the figures, and beginning with FIG. 1, there is depicted a block diagram representation of an example data processing system (DPS) 100, within which the functional aspects of the described embodiments may advantageously be implemented. DPS 100 includes numerous components logically connected by Interconnect 106. Specifically, FIG. 1 depicts DPS 100 including Memory 102, central processing unit (CPU) 104 (also interchangeably referred to as a processor), Storage 106, Input/Output (I/O) controller 108, and network interface (NI) 110. Those skilled in the art will appreciate that CPU 104 can also be any kind of hardware processor. In addition, FIG. 1 depicts that DPS 100 may be connected via network interface (NI) 110, as an example network I/O adapter, to Network Shared Storage 134A-134N and second DPS 132 across Network 112.

I/O controller 108 allows a user to interface with DPS 100 via one or more I/O devices. As depicted, I/O controller 108 provides an interface for such devices as Display Device 126, Keyboard 128, and Mouse 130. According to one or more embodiments, Display Device 126 may include a liquid crystal display (LCD), a plasma display, a cathode ray tube (CRT) monitor, or any other kind of output mechanism.

Memory 102 may be random access memory (RAM), cache memory, flash memory, or any other kind of storage structure that is configured to store computer instructions/code executable by CPU 104 and/or to store data utilized during such execution. As depicted, Memory 102 includes Operating System 114. Operating System 114 may be any platform that manages the execution of computer code and manages hardware resources. For example, Operating System 114 may be the Advanced Interactive Executive (AIX®) operating system, the LINUX® operating system, or any other operating system known in the art. AIX® is a registered trademark of International Business Machines Corporation, and LINUX® is a registered trademark of Linus Torvalds.

Memory 102 also includes one or more Applications 118 and a plurality of functional modules, such as Fileset Manager Module 120. For purposes of clarity of this description, Application 118 is executable computer code which can be executed and which can modify a file system (not shown) within DPS 100.

As depicted, DPS 100 also includes persistent storage device or Storage 106. Storage 106 may be any kind of computer storage device, such as a hard disk, an optical drive such as a compact disk drive or digital video disk (DVD) drive, and a flash memory drive. Storage 106 may include Consistency Snapshot Data Store 124. In one or more embodiments, Consistency Snapshot Data Store 124 includes consistency snapshots of a file system. The consistency snapshots may be collected periodically.

Those of ordinary skill in the art will appreciate that the hardware components and basic configuration depicted in FIG. 1 may vary. The illustrative components within DPS 100 are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing system depicted in FIG. 1 may be, for example, an IBM eServer pSeries system, a product of International Business Machines Corporation in Armonk, N.Y., running the Advanced Interactive Executive (AIX) operating system or LINUX operating system.

Figure 2:
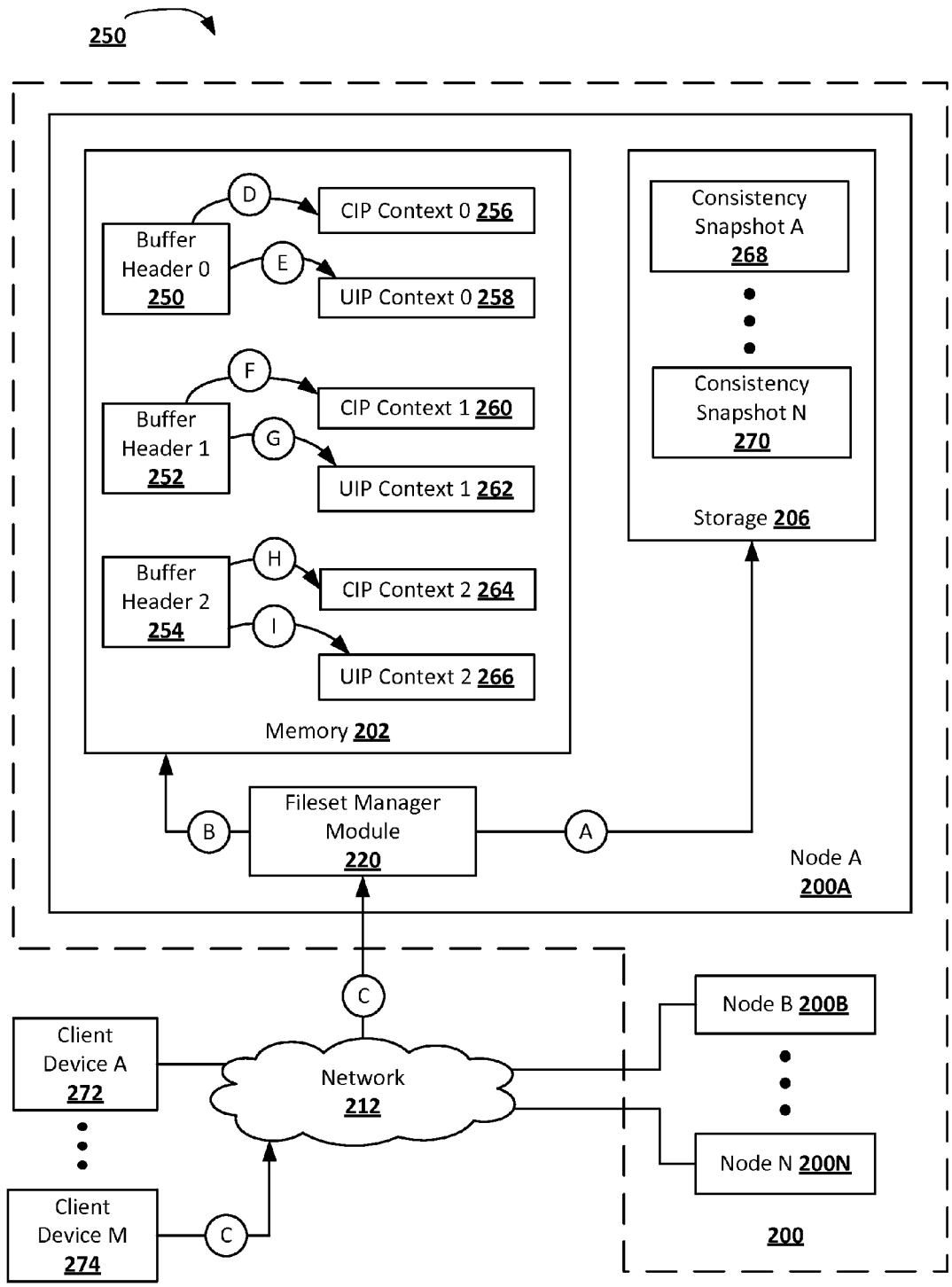
FIG. 2 provides a block diagram representation of an example computing environment with multiple nodes for a clustered file system connected within a network architecture, according to one embodiment.

FIG. 2 illustrates a block diagram representation of an example computing environment 250 with multiple nodes for a clustered file system 200 distributed among nodes within a network architecture, according to one embodiment. Specifically, FIG. 2 depicts a more detailed conceptual diagram of configuration of clustered file system 200, including multiple contexts for data objects in a redirect-on-write file system, according to one or more example embodiments.

FIG. 2 illustrates a network architecture for distributed system 250. Distributed system 250 includes nodes and client devices connected across Network 212. Specifically, as depicted, distributed system 250 includes Node A 200A, Node B 200B, and Node N 200N. In one or more embodiments, Node A 200A, Node B 200B, and Node N 200N are physical devices which may collectively store a distributed file system. Client devices 272 and 274 are also connected to Network 212. In one or more embodiments, Client Device 272 and Client Device 274 are computing devices (such as DPS 100 in FIG. 1) that communicate across Network 212 to modify the distributed file system.

In some example embodiments, the computing environment 250 is configured to store data objects of a file system that uses redirect-on-write (ROW) when data is modified. In particular, with a redirect-on-write, a new block is allocated for modified data. The file system 200 can include one or more file sets stored within one or more nodes. In some example embodiments, each file in the file system can include an inode. The inode can be a separate file or a data structure that stores information or metadata about the data stored in the file. For example for each part of the file (e.g., a block), the inode can store the address, the fileset identification, and the generation of the fileset where this data is stored. In particular, blocks where the data of a file are stored can be distributed across different filesets and different generations of filesets. The different filesets and generations of filesets can be distributed across multiple storage devices, which can respectively be located within different physical nodes within the clustered file system 200. For example, the clustered file system 200 may be distributed across Node A 200A, Node B 200B, and Node N 200N. These nodes can generally represent the clustered file system.

Node A 200A is illustrated with a number of functional components. It is appreciated that although not shown, Node B 200B and Node N 200N can include similar components therein. Included within Node A 200A are Fileset Manager 220, storage 206, and memory 202 (e.g., a volatile machine-readable medium) that are communicatively coupled together. Fileset Manager 220 can be software, firmware, hardware or a combination thereof. For example, Fileset Manager 220 can be part of an operating system executing on a processor (e.g., CPU 104, FIG. 1) in Node A 200A. Storage 206 stores a number of consistency snapshots that have already been created (shown as Consistency Snapshot A 268 through Consistency Snapshot N 270) in consistency snapshot data store 124 (FIG. 1). In some example embodiments, the consistency snapshots are periodically created (e.g., created every five seconds). The consistency snapshots include a snapshot of the data objects in the file system at a given point in time. In at least one example embodiments, a consistency snapshot stores any modifications (e.g., changes, additions, deletions, etc.) to the data objects that have not yet been committed to consistency snapshot data store 124 in storage 106/206, since the last consistency snapshot was committed to storage. These consistency snapshots are created to allow for recovery of previous versions of objects stored in the file system. For example, these consistency snapshots can be used to recover objects stored in the file system after a system crash.

Memory 202 stores a number of buffer headers of which three example buffer headers are illustrated, buffer header 0 250, buffer header 1 252, and buffer header 2 254. As further described below (see description of FIG. 3), the buffer headers store various metadata related to a data object stored in the file system. Fileset manager 220 creates a buffer header for a data object in memory 202 if the data object is being accessed, modified, etc., and where a buffer header had not yet been created for that data object. For example, fileset manager 220 can create a buffer header when the data object is being accessed to create current consistency snapshot and/or when the data object is being modified based on some client device request. Based on the size of memory 202 and the number of data objects being accessed, fileset manager 220 may be required to flush some of the buffer headers whose associated data objects are not being accessed. Accordingly, fileset manager 220 may be required to recreate a buffer header for a data object (in memory 202) that was previously accessed, when a later access of the data object occurs.

In one or more embodiments, the filesest manager 220 manages obtaining consistency snapshots by maintaining dual contexts for each data object in memory 202. Specifically, when generating a consistency snapshot, a copy of the data object is maintained in memory 202 while the copy of the data object is stored in persistent storage 206. In one or more embodiments, the copy of the data object maintained in memory 202 while the copy is being stored in storage 206 is a commit-in-progress (CIP) context. It is possible that, while a CIP context of a data object is being stored in persistent storage 206, modifications are made to the data object. In order to concurrently allow CIP to be stored in persistent storage, and allow modifications to be made to the data object, the fileset manager 220 creates a second context. For example, one of Client Device A 272 and Client Device M 274 may modify the data object in the file system. In one or more embodiments, the fileset manager 220 creates an update-in-progress (UIP) context for the data object using a copy of the CIP context. Accordingly, the fileset manager 220 can store a consistency snapshot of the file system, including the data object, while allowing modifications to that data object. As further described below, the metadata in the buffer header stores a data pointer for the CIP context and the UIP context for the given data object.

For example, in one or more embodiments, the buffer header for each data object may point to a CIP context and a UIP context corresponding to the data object. In the example illustrated by FIG. 2, buffer header 0 250 has a first data pointer pointing to CIP Context 0 256 and a second data pointer pointing to UIP Context 0 258. Similarly, buffer header 252 includes a pointer to CIP Context 1 260 and UIP Context 1 262, and buffer header 254 includes a pointer to CIP context 2 264 and UIP context 2 266. Those skilled in the art will appreciate that each of buffer header 0 250, buffer header 1 252, and buffer header 2 254 correspond to a unique data object. The two contexts for a same data object provide consistency snapshots of data in a file system, where such snapshots do not block or delay incoming file system transactions while the consistency snapshot is being committed to storage. Accordingly, updates to data stored in the file system can occur concurrently with the storage of consistency snapshots of the same file system via creation and utilization of the UIP Context corresponding to the data object.

FIG. 2 also depicts a set of labels A-I, representing a sequence of operations performed by fileset manager module 220 (executing on the CPU of node A 200A). In this example, fileset manager module 220 (hereinafter referred to as fileset manager, for simplicity) performs operation A, whereby fileset manager 220 initiates creation of a current consistency snapshot for a file system. As part of the operation of creating a current consistency snapshot, fileset manager 220 can determine what data objects have been modified since the previous consistency snapshot was committed to storage. Fileset manager 220 can then write the modified data objects to new locations in storage 206 in a bottom-up order. In one or more example embodiments, for each data object that is associated with a CIP context being stored in current consistency snapshot, fileset manager 220 can update an associated buffer header in memory 202 for the data object (shown as operation B). If there is no associated buffer header in memory 202 for a particular data object, fileset manager 220 creates the buffer header when that data is being accessed to be stored in a current consistency snapshot.

As further described below in reference to FIG. 4, the buffer header for each data object includes various metadata (e.g., generation, context, location, data pointers). Fileset manager 220 updates this metadata as part of creating the buffer header in memory 202. Alternatively, if the buffer header is already instantiated within memory 202 for a given data object, fileset manager 220 can update the metadata therein. For example, fileset manager 220 can update various fields defining the generations and contexts for the multiple data objects being referenced by the data pointers (as further described below).

Also, according to one embodiment, prior to completion of the commit to storage of a current consistency snapshot, a data object that is to be included in a current consistency snapshot is selected to be modified. In the present example, client device 274 transmits an update request for a data object that is part of current consistency snapshot. The update request is transmitted over network 212 (shown as operation C) and is received by fileset manager 220. In this situation, fileset manager 220 creates a second copy of the data in the data object by making a copy of the first copy of the data (for example, UIP Context 0 258 may be created by copying CIP Context 0 256). In one more example embodiments, the UIP Context is not created until the UIP Context is needed. For example, fileset manager 220 does not create the second copy until an update to a data object is requested while a consistency snapshot to store the same data object is in the process of being created and/or committed. Also, fileset manager 220 creates and/or updates the buffer header for this data object in memory 202. For example, fileset manager 220 can update the second data pointer in the buffer header to point to the second copy of the data. Also, fileset manager 220 updates the contexts so that the two different copies of the data have two different contexts. A more detailed description of the operations of fileset manager 220 to provide multiple contexts for a data object are set forth below in reference to the flowchart of FIG. 4.

FIG. 3 depicts an example buffer header for a data object that is stored in a clustered file system, according to one embodiment. Buffer header 300 includes a number of fields related to a data object stored in a clustered file system. As described above, a buffer header for a data object is created in memory 202 in response to accessing the data object, if a buffer header does not already exist in memory for the data object. For example, fileset manager 220 can access the data object in order to generate a consistency snapshot for a file system including the data object. In another example, fileset manager 220 can access the data object in response to some application updating the data object (e.g., via client devices 272, 274). In addition to creating the buffer header, fileset manager 220 can also populate the fields (302-316) in the buffer header. Fields 302-304 define two different generation values for this data object. Last Committed Generation (LCG) field 302 defines the generation value for the data object during the last time when the data object was committed to storage as part of a consistency snapshot. Last Updated Generation (LUG) field 304 defines the generation value for the data object during the last time when this data object was being updated. The generation value of a data object is incremented each time the data object is initially updated but prior to the data object being committed to persistent storage as part of a consistency snapshot. For example, assume the current generation value of the data object is 15. If some application attempts to update the data object after the data object has been committed to persistent storage as part of a consistency snapshot, the generation value is incremented to 16. This generation value of the data object remains at 16 until the data object is committed to persistent storage as part of a consistency snapshot.

Fields 306-308 define two different context values for the data object. These contexts values are set to either zero or one. In particular, the context values for a data object flip between two values (i.e., two values identifying the CIP context and UIP context, respectively). Last Committed Context (LCC) field 306 defines the context for this data object during the last time when this data object was committed to storage in a consistency snapshot. Last Updated Context (LUC) field 308 defines the context for this data object during the last time when this data object was being updated. For example, after the data object is committed to persistent storage as part of a consistency snapshot but prior to an update to the data object, both LCC field 306 and LUC 308 are set to a same value (e.g., one). Subsequently if some application attempts to update the data object, LUC field 308 is flipped to a value of zero. Subsequently when this data object is again committed to persistent storage as part of a consistency snapshot, LCC field 306 is flipped to a value of zero. The use of fields 302-308 are further described below in reference to the flowchart of FIG. 4.

Physical location field 310 defines the physical location of the data object in the file system (e.g., the block number). Logical location field 312 defines the logical location where the data object is stored based on the location of the associated inode for this data object. For example, the logical location can include the physical location of the inode plus some offset where this data object is stored.

Data pointer 0 field 314 stores a first data pointer (data pointer 0) that is pointing to a first context corresponding to the data object in memory 202. Data pointer 1 field 316 stores a second data pointer (data pointer 1) that is pointing to a second context corresponding to the data object in memory 202. As described above, a second copy of the data of the data object is not created until a second context for the data object is required. For example, only one copy of data of the data object can be provided after the data object has been committed to persistent storage as part of a consistency snapshot but prior to any subsequent updates to the data object. In this situation, data pointer 0 field 314 points to the first copy of the data, and data pointer 1 field 316, which would be pointing to the second copy of the data, if a second copy exists, does not point to a location (e.g., the data point 1 field 316 has a NULL value). A second copy of the data is created by copying the first copy of the data after a second context is needed for the data object. For example, assume that the data object is being stored in a consistency snapshot and concurrently a client device is requesting an update to the data object. In this situation, the second copy of the data object is created. Also, data pointer 0 field 314, which is utilized to point to the first copy of the data, still points to the first copy of the data, and data pointer 1 field 316, which is utilized to point to the second copy of the data, is now modified to point to the second copy of the data of the data object. The use of fields 314-316 are further described below in reference to the flowcharts of FIG. 4.

Figure 4:
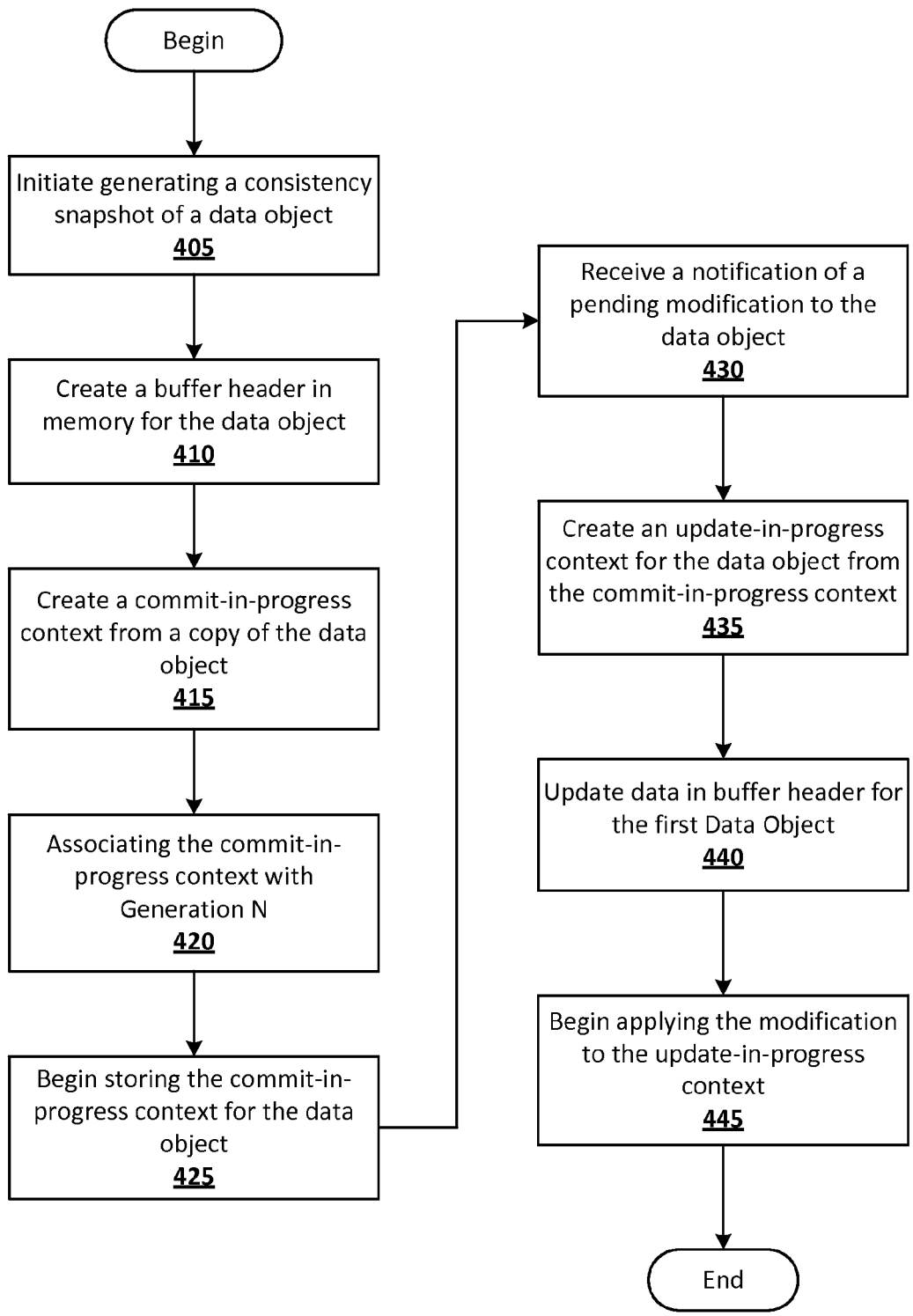
FIG. 4 is a flow chart illustrating the method for storing a consistency snapshot of a data object, according to one embodiment.

FIG. 4 is a flow chart illustrating the method for storing a consistency snapshot of a data object, according to one embodiment. Specifically, FIG. 4 illustrates a method, implemented by the fileset manager (which provides executable code that the processor executes), to generate a consistency snapshot of a data object while concurrently modifying the data object by utilizing dual contexts of the data object. Functional aspects of the method are described herein as being performed by the fileset manager, with the understanding that the fileset manager can be stored program code that is executed by the CPU on the particular node to provide the described functions.

The method begins at block 405 where fileset manager 220 initiates generating a consistency snapshot of a data object. In some example embodiments, fileset manager periodically (e.g., every three seconds, five seconds, 10 seconds, etc.) commits to storage of a current consistency snapshot. In some example embodiments, current consistency snapshot can include data objects that have been modified since the prior consistency snapshot. Those changes to the data objects can reside in memory, such that the changes have not yet been committed to persistent storage medium, such as storage 106/206.

At block 410, the fileset manager creates a buffer header in memory for the data object. In particular, in one or more example embodiments, each time a data object is accessed (i.e., read from, written to, etc.), an associated buffer header is created in memory. With reference to FIG. 2, fileset manager 220 creates a buffer header in memory 202 for the data objects that do not have a buffer header in memory. Fileset manager can also update the fields of the buffer header. With reference to FIG. 3, fileset manager 202 sets the values of these fields for the buffer headers for each of the data objects. Fileset manager 202 sets both LCG field 302 and LUG field 304 to the current generation value for the data object. For example, if the last committed consistency snapshot had a value of 5, fileset manager 202 would set LCG field 302 and LUG field 304 to 5. Context fields (306, 308) are set to either zero or one to differentiate between the two contexts (CIP context and UIP context). Therefore if a second context is required, these two context fields 306, 308 would have opposite values. If only one context is required, these two context fields 306, 308 would have the same value. In this situation, only one context for the data object is needed. Therefore, fileset manager 220 sets LCC field 306 and LUC field 308 to a same value (e.g., one). Fileset manager 220 sets physical location field 310 based on the data object's location in the file system (e.g., the block number). Fileset manager 220 sets logical location field 312 based on the location of the associated inode for this data object. For example, the logical location can include the physical location of the inode plus some offset where this data object is stored. Fileset manager 220 updates data pointer 0 field 314 in buffer header 300 to point to the location in memory 202 where the first copy of the data is located. Because this situation is not requiring multiple contexts, a second data object is not needed. Accordingly, fileset manager 202 updates data pointer 1 field 316 to point to NULL.

At block 415, the fileset manager creates a CIP context from a copy of the data object. In one or more embodiments, fileset manager also updates the physical location, the logical location, the LCG field, and the LCC field in the buffer header for the data object. With reference to FIGS. 2-3, fileset manager 202 updates physical location field 310, logical location field 312, LCG field 302, and LCC field 306 for buffer header 300. In one or more embodiments, fileset manager 220 sets physical location field 310 based on the data object's location in the file system (e.g., the block number). Fileset manager 220 sets logical location field 312 based on the location of the associated inode for this data object. For example, the logical location can include the physical location of the inode plus some offset where this data object is stored. Context fields (306, 308) are set to either 0 or 1 to differentiate between the two contexts (CIP context and UIP context). Therefore if a second context is required, these two context fields 306, 308 would have opposite values. If only one context is required, these two context fields 306, 308 would have the same value.

Assume that fileset manager 220 sets LCC field 306 to 1. At block 420, the fileset manager associates the CIP context with Generation N. For example, if the last committed consistency snapshot had a value of 5, fileset manager would set LCG field 302 to 5. At block 425, the fileset manager begins to store the CIP context in persistent storage.

Continuing at block 430, fileset manager receives a notification of a pending modification to the data object, which is concurrently being stored in persistent storage. At block 435, the fileset manager creates an UIP context for the data object. According to one or more embodiments, the fileset manager creates the UIP context by making a copy of the CIP context.

At block 440, fileset manager updates data in the buffer header for the data object. Specifically, in one or more embodiments, the fileset manager sets a second data pointer in the buffer header to point to the second copy of the data object. In one or more embodiments, fileset manager updates the LUC field in the buffer header to have an opposite value to the value of the LCC field. The fileset manager increments the generation value for the LUG field in the buffer header (based on the generation value for the LCG field). With reference to FIGS. 2-3, fileset manager 220 updates the generation value for LUG field 304, based on the generation value for LCG field 302. For example, if LCG field 302 has a value of 5, fileset manager would set LUG field 304 to 5+1 or 6.

At block 445, fileset manager begins applying the modification to the UIP context. Additional updates to the same or different data objects in the file system can continue to occur. Also, after completion of the committing of the consistency snapshot, the fileset manager can commit an additional consistency snapshot (based on the periodic interval for committing consistency snapshots to persistent storage.

Figure 5:
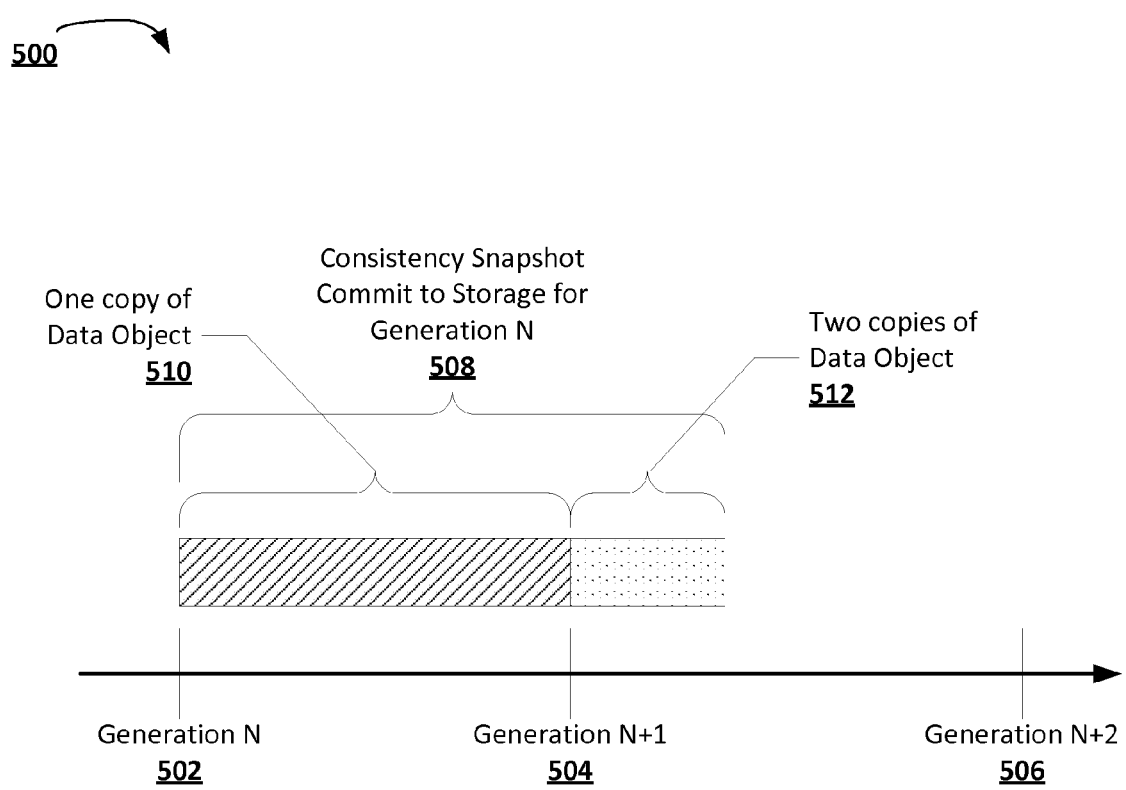
FIG. 5 depicts an example timeline of committing a consistency snapshot relative to multiple generations of a data object, according to one or more embodiments.

FIG. 5 depicts an example timeline of committing a consistency snapshot relative to multiple generations of a data object, according to some embodiments. Time line 500 increases over time from left to right. Time point 502 is a time when generation N for a data object is created. Time point 504 is a later time when a later generation (generation N+1) for the same data object is created. Time point 506 is a later time when a later generation (generation N+2) for the same data object is created. Time period 508 is a period of time when a consistency snapshot is being committed to persistent storage. As shown, within time period 508, there are two sub periods: time period 510 and time period 512. Time period 510 includes a period of time wherein only one copy of the data object is needed. For example, this time period can include a time when the data object is being committed to persistent storage, where the data object has not yet been modified (e.g., by application executing on a client device). Time period 512 includes a period of time where two copies of the data object are needed. Time period 512 is initiated in response to generation N+1 being created for the data object. For example, this time period can include a time when the data object is being committed to persistent storage and when the data object is being modified (e.g., application executing on a client device).

Figure 6:
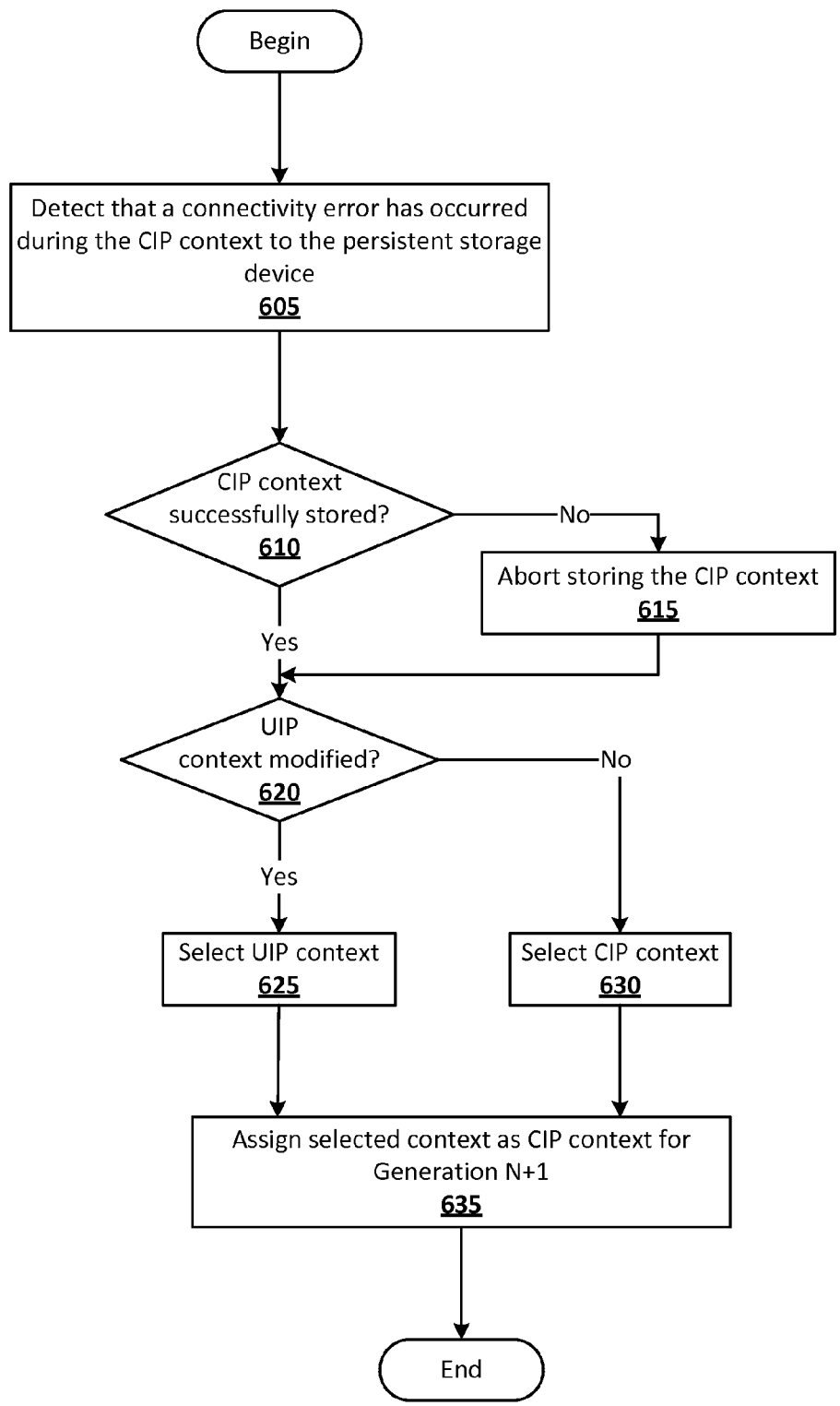
FIG. 6 is a flow chart illustrating the method for handling a consistency snapshot error, according to one embodiment.

FIG. 6 depicts a flow chart illustrating the method for handling a consistency snapshot error, according to one embodiment. Specifically, FIG. 6 illustrates the method conducted by the fileset manager when an error occurs by merging the CIP context and the UIP context for a data object. When an error occurs, the fileset manager merges the CIP context and the UIP context for each data object in the file system.

The method begins at block 605, where the fileset manager detects that a connectivity error has occurred during the CIP context to the persistent storage device. In one or more embodiments, the error may be caused by any event that prevents the CIP context from being stored in the persistent storage device, such as a failure in a connection medium connecting the memory including the CIP context, and the persistent storage device.

At decision block 610 the fileset manager determines whether the commit-in-progress context has been successfully stored, i.e., whether storage of the CIP context has completed successfully. In the event that the CIP context has not been successfully stored, the method continues at decision block 615, at which the fileset manager aborts storing the CIP context. In one or more embodiments of the invention, any data of the current consistency snapshot that was stored prior to aborting the storage of the CIP snapshot, will be eliminated from storage. For example, if the CIP context refers to the CIP context of FIG. 4, the fileset manager will abort storing the CIP context that began at block 425.

After block 615, and, in response to a determination that the CIP context has been successfully stored, the method continues at decision block 620. At decision block 620, a determination is made whether an UIP context for the data object has been modified. In one or more embodiments, the UIP context may be created, but not yet modified, when the error occurs. In the event that the UIP context has not yet been modified at the time of the error, the method continues at block 630, where the fileset manager selects the CIP context. Returning to decision block 615, if the UIP context for the data object has been modified, then at block 625, the fileset manager selects the UIP context.

Once one of the CIP context and the UIP context has been selected, the method continues at block 635, at which the selected context becomes the new commit-in-progress context for the data object. The fileset manager can then initiate storage of the new CIP context, if the condition that caused the error is no longer present. In one or more embodiments, the fileset manager modifies the buffer header for the data object to point to the selected context as the new CIP context. In addition, in one or more embodiments, the fileset manager modifies the buffer header to indicate that the new CIP context is associated with generation N+1. Those skilled in the art will appreciate that by aborting the storing of the CIP context that began at block 425, and eliminating any data that has been stored in persistent storage for that CIP context, persistent storage will not include a consistency snapshot for generation N. Rather, persistent storage will include a consistency snapshot for generation N−1, and a consistency snapshot for generation N+1, indicating that an error occurred at generation N.

Those skilled in the art will appreciate that by assigning the merged context as the CIP context, the fileset manager may also update the buffer header for the data object to indicate, at least, the new generation value (e.g. N+1), as well as the data pointer. Other values in the buffer header may also be updated, in the same manner as was described with respect to FIG. 4 above. Further, by assigning the merged context as the new CIP context at block 645, the method may continue at block 425 of FIG. 4, and the fileset manager begins to store the new CIP context (e.g., the selected context) in persistent storage. To clarify the description of the method captured by the figure, the method is illustrated and described with respect to one data object. However, in one or more embodiments, the features depicted in blocks 610-635 may occur for multiple data objects in a file system at a time an error is detected for any CIP context. Further, in one or more embodiments, the file system is a hierarchical file system, including parent data objects and child data objects. Between snapshots, each parent object may manage a list of child data objects which have been modified. In one or more embodiments, blocks 610-635 may be implemented only for the data objects in a file system that have been modified, which may be indicated by the parent data objects in the hierarchical file system.

In each of the flow charts above, one or more of the methods may be embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Figure 7:
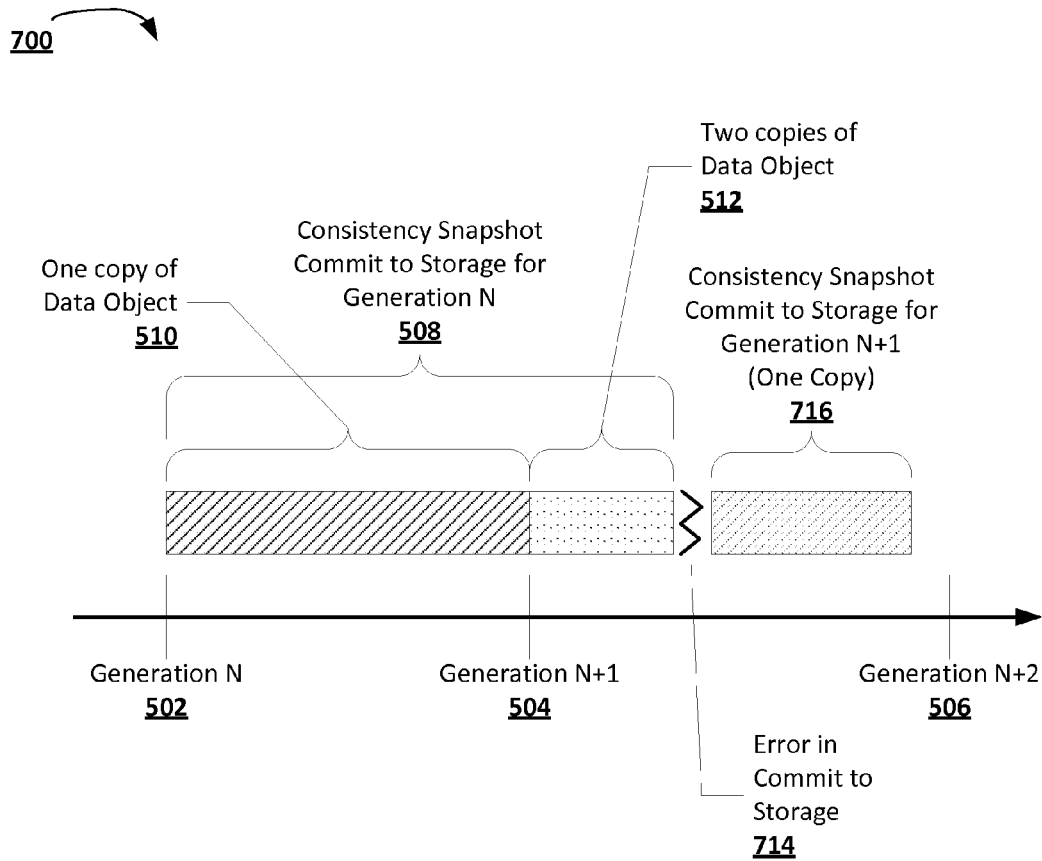
FIG. 7 depicts an example timeline of handling a consistency snapshot error relative to multiple generations of a data object, according to one or more embodiments.

FIG. 7 depicts an example timeline of handling a consistency snapshot error during multiple generations of a data object, according to one or more embodiments. Time line 700 increases over time from left to right. Time point 502 represents a time when generation N of a data object is created. Time point 504 represents a later time when a later generation (generation N+1) for the same data object is created. Time point 506 represents an even later time when a later generation (generation N+2) for the same data object is created. Time period 508 is a period of time during which a consistency snapshot is being committed to persistent storage (that includes the data object). As shown, within time period 508 there are two sub periods—time period 510 and time period 512. Time period 510 includes a period of time in which only one copy of the data object is needed. For example, this time period can include a time when the fileset manager is storing the CIP context in persistent storage, where the data object has not yet been modified (e.g., by an application executing on a client device). Time period 512 includes a period of time in which two copies of the data object are needed. Time period 512 is initiated in response to generation N+1 being created for the data object. For example, this time period can include a time when the data object is concurrently being modified (e.g., by application executing on a client device), while the CIP context of the data object is being committed to persistent storage.

Time line 700 illustrates that an error has occurred at 714. As described above, the error could originate from, for example, a connectivity error between a physical device on which the CIP is located and the persistent storage device, or any other error which prevents successful communication between the CIP context and the persistent storage device. In response to the error being detected at 714, the fileset manager merges the CIP context and the UIP context for each data object to be represented in a consistency snapshot for a file system. When the next consistency snapshot is initiated at 716, only one copy of the data (e.g., the selected context, which is the new CIP context) exists.

Figure 8:
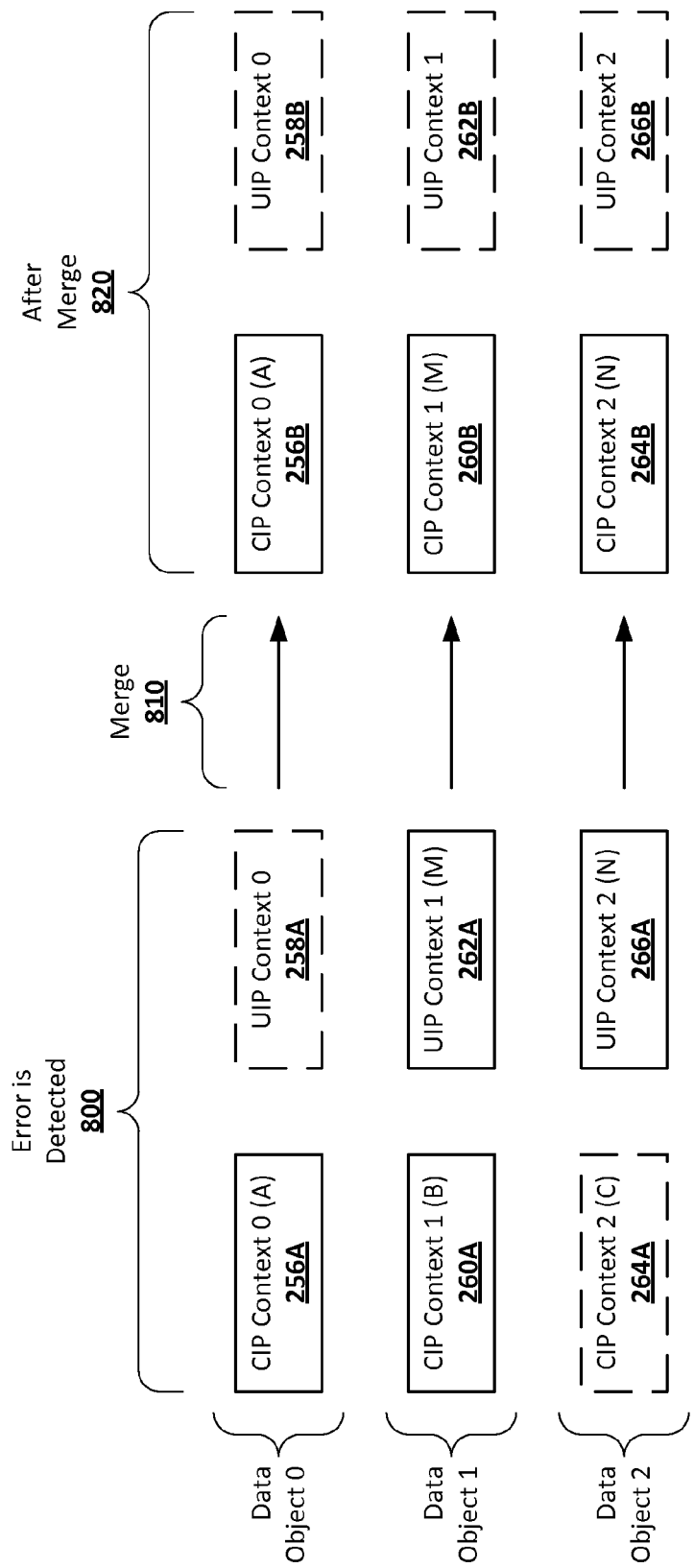
FIG. 8 is an example sequence diagram of the method for achieving consistency snapshots in response to an error, according to one embodiment.

FIG. 8 is an example sequence diagram of the method for achieving consistency snapshots in response to an error, by merging dual contexts for one or more data objects, according to one embodiment. Specifically, FIG. 8 depicts the method illustrated by FIG. 6, as the method applies to a file system including three data objects, Data Object 0, Data Object 1, and Data Object 2. Those skilled in the art will appreciate that the illustration depicted in FIG. 8 is intended only to provide an example embodiment of the disclosure, and is not intended to limit the disclosure in any way.

The example depicts an example diagram of a set of data objects at a time an error is detected 800, and after contexts are merged 820. The example file system 200 includes three data objects: Data Object 0, Data Object 1, and Data Object 2. At the time 800 when an error is detected, Data Object 0 is associated with CIP context 0 256A. CIP Context 0 256A is shown as including data, which is indicated by the parenthetical "A". At time 800, the fileset manager is storing the data of CIP context 0 256A into persistent storage. For purposes of this illustration, Data Object 0 is not associated with a UIP context at time 800. However, UIP context 0 258A is depicted in this illustration using dashed lines to indicate that, at the time the error was detected, UIP context 0 258A had not been generated. This may happen, for example, if the fileset manager was storing the data in CIP context 0 256A, but no further modifications occurred to Data Object 0. Accordingly, the fileset manager did not need to create the UIP context 0 258A.

Also at time 800, Data Object 1 is associated with CIP context 1 260A, and UIP context 1 262A. As depicted, CIP context 1 260A includes data "B," and UIP context 1 262A includes data "M." Those skilled in the art will appreciate that CIP context 1 260A and UIP context 1 262A depict that while data "B" is being stored to persistent storage, Data Object 1 has been modified to include Data M, which replaced data A as the data within the UIP context since the time the last consistency snapshot occurred.

In addition, at time 800, Data Object 2 is associated with CIP context 2 264A, and UIP context 2 266A. As depicted, CIP context 2 264A includes data "C," and is represented by a dashed line. For purposes of this illustration, the dashed line around CIP context 2 264A indicates that CIP context 2 264A has been successfully stored in persistent storage at time 800. Data Object 2 is also associated with UIP context 2 266A, which includes data "N" at time 800. For purposes of this illustration, data "C" of Data Object 2 is depicted as being replaced by data "N" in Data Object 2. At Merge 810, the features depicted by blocks 610-630 of FIG. 6 are applied for each data object by the fileset manager. Accordingly, different contexts may be selected for the merged context for each data object. During Merge 810, the fileset manager CIP context 0 256A is selected for Data Object 0. In addition, UIP context 1 262A is selected for Data Object 1, and UIP context 2 266A is selected for Data Object 2.

After Merge 800, the fileset manager assigns the selected context for each data object as a new CIP context for the data object. Thus, at time 810, CIP context 0 256B includes Data "A." Further, CIP context 1 260B includes data "M." It is important to note that, according to one or more embodiments, no consistency snapshot depicting data "B" will be stored in persistent storage. Finally, with respect to Data Object 2, CIP context 2 264B includes data "N." In addition, although each of Data Objects 0, 1, and 2 may eventually be associated with an UIP context after Merge 800, an UIP context is not necessary unless and/or until an update is made to the data object. Thus, UIP context 0 258B, UIP context 1 262B, and UIP context 2 266B are depicted by dashed lines.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method comprising:
   a processor creating a commit-in-progress context from a copy of a first data object in a redirect-on-write file system;
   the processor initiating storage of the commit-in-progress context in a persistent storage device;
   in response to receiving a notification of a modification that is pending for the first data object while storing the commit-in-progress context in the persistent storage device:
      creating an update-in-progress context from a copy of the commit-in-progress context; and
      initiating application of the modification to the update-in-progress context;
   in response to detecting a connectivity error between the commit-in-progress context and the persistent storage device while storing the commit-in-progress context in the persistent storage device, determining whether storage of the commit-in-progress context in the persistent storage device successfully completed; and
   in response to determining storage of the commit-in-progress context in the persistent storage device did not successfully complete:
      aborting the storing of the commit-in-progress context in the persistent storage device;
      assigning a new commit-in-progress context from among the commit-in-progress context and the update-in-progress context; and
      initiating storage of the new commit-in-progress context to the persistent storage device.

2. The method of claim 1, further comprising:
   in response to determining storage of the commit-in-progress context in the persistent storage device successfully completed, assigning the update-in-progress context as the new commit-in-progress context.

3. The method of claim 1, further comprising:
   in response to determining storage of the commit-in-progress context in the persistent storage device did not successfully complete:
      determining whether the modification was successfully applied to the update-in-progress context;
      in response to determining the modification was successfully applied to the update-in-progress context, assigning the update-in-progress context as the new update-in-progress context;
      in response to determining that the modification was not successfully applied to the update-in-progress context, assigning the commit-in-progress context as the new update-in-progress context.

4. The method of claim 1, wherein the commit-in-progress context is associated with a first generation value, and wherein assigning the new commit-in-progress context comprises assigning a second generation value to the new commit-in-progress context.

5. The method of claim 1, wherein the redirect-on-write file system is a hierarchical file system comprising the data object, and wherein each parent object in the hierarchical file system dynamically manages a set of child data objects that are associated with the update-in-progress context.

6. The method of claim 5, further comprising, in response to detecting the connectivity error:
   aborting the storing, in the persistent storage device, of the commit-in-progress contexts for each of the set of child data objects;
   assigning the new commit-in-progress context for each of the set of child data objects; and
   initiating storage of the new commit-in-progress contexts, for each of the set of child data objects to the persistent storage device.

7. A system comprising:
   a processor;
   a memory; and
   a fileset manager, executable by the processor, that causes the processor to:
      create a commit-in-progress context from a copy of a first data object in a redirect-on-write file system;
      initiate storing the commit-in-progress context in a persistent storage device;
      in response to receiving a notification of a modification that is pending for the first data object, while storing the commit-in-progress context in the persistent storage device:
         create an update-in-progress context from a copy of the commit-in-progress context; and
         initiate application of begin applying the modification to the update-in-progress context;
      in response to detecting a connectivity error between the commit-in-progress context and the persistent storage device while storing the commit-in-progress context in the persistent storage device, determine whether storage of the commit-in-progress context in the persistent storage device successfully completed; and
      in response to determining storage of the commit-in-progress in the persistent storage device did not successfully complete:
         abort the storing of the commit-in-progress context in the persistent storage device;
         assign a new commit-in-progress context from among the commit-in-progress context and the update-in-progress; and
         initiate storage of the new commit-in-progress context to the persistent storage device.

8. The system of claim 7, the fileset manager further causing the processor to:
   in response to determining storage of the commit-in-progress context in the persistent storage device successfully completed, assign the update-in-progress context as the new commit-in-progress context.

9. The system of claim 7, fileset manager further causing the processor to:
   in response to determining storage of the commit-in-progress context in the persistent storage device did not successfully complete:
      determine whether the modification was successfully applied to the update-in-progress context;
      in response to determining the modification was successfully applied to the update-in-progress context, assigning the update-in-progress context as the new commit-in-progress context;
      in response to determining that the modification was not successfully applied to the update-in-progress context, assigning the commit-in-progress context as the new commit-in-progress context.

10. The system of claim 7, wherein the commit-in-progress context is associated with a first generation value, and wherein assigning the new commit-in-progress context comprises assigning a second generation value to the new commit-in-progress context.

11. The system of claim 7, wherein the redirect-on-write file system is a hierarchical file system comprising the data object, and wherein each parent object in the hierarchical file system dynamically manages a set of child data objects that are associated with the update-in-progress context.

12. The system of claim 11, fileset manager further causing the processor to:
   in response to detecting the connectivity error:
      abort the storing, in the persistent storage device, of the commit-in-progress contexts for each of the set of child data objects;
      assign the new commit-in-progress context from the commit-in-progress context and the update-in-progress context for each of the set of child data objects; and
      initiate storage of the new commit-in-progress contexts, for each of the set of child data objects to the persistent storage device.

13. A computer readable storage medium comprising computer readable code that when executed by a processor provides the functions of:
   creating a commit-in-progress context from a copy of a first data object in a redirect-on-write file system;
   initiating storage of the commit-in-progress context in a persistent storage device;
   in response to receiving a notification of a modification that is pending for the first data object while storing the commit-in-progress context in the persistent storage device:
      creating an update-in-progress context from a copy of the commit-in-progress context; and
      initiating application of the modification to the update-in-progress context;
   in response to detecting a connectivity error between the commit-in-progress context and the persistent storage device while storing the commit-in-progress context in the persistent storage device, identifying whether storage of the commit-in-progress context in the persistent storage device successfully completed; and
   in response to determining storage of the commit-in-progress in the persistent storage device did not successfully complete:
      aborting the storing of the commit-in-progress context in the persistent storage device;
      assigning a new commit-in-progress context from among the commit-in-progress context and the update-in-progress; and
      initiating storage of the new commit-in-progress context to the persistent storage device.

14. The computer readable storage medium of claim 13, wherein the computer readable code further comprises code for:
   in response to determining storage of the commit-in-progress context in the persistent storage device successfully completed; assigning the update-in-progress context as the new commit-in-progress context.

15. The computer readable storage medium of claim 13, the computer readable code further comprises code for:
   in response to determining storage of the commit-in-progress context in the persistent storage device did not been successfully complete:
      determining whether the modification was successfully applied to the update-in-progress context;
      in response to determining the modification was successfully applied to the update-in-progress context, assigning the update-in-progress context as the new commit-in-progress context; and
      in response to determining that the modification was not successfully applied to the update-in-progress context, assigning the commit-in-progress context as the new commit-in-progress context.

16. The computer readable storage medium of claim 13, wherein the commit-in-progress context is associated with a first generation value, and wherein merging the commit-in-progress context and the update-in-progress context comprises assigning a second generation value to the new commit-in-progress context.

17. The computer readable storage medium of claim 13, wherein the redirect-on-write file system is a hierarchical file system comprising the data object, and wherein each parent object in the hierarchical file system dynamically manages a set of child data objects that are associated with the update-in-progress context.

18. The computer readable storage medium of claim 17, the computer readable code further comprises code for:
   in response to detecting the connectivity error:
      aborting the storing, in the persistent storage device, of the commit-in-progress contexts for each of the set of child data objects;
      assigning the new commit-in-progress context from the commit-in-progress context and the update-in-progress context for each of the set of child data objects; and
      initiating storage of the new commit-in-progress contexts, for each of the set of child data objects to the persistent storage device.

* * * * *